M. J. NUNES.
RAT TRAP.
APPLICATION FILED OCT. 5, 1911.
1,086,610. Patented Feb. 10, 1914.
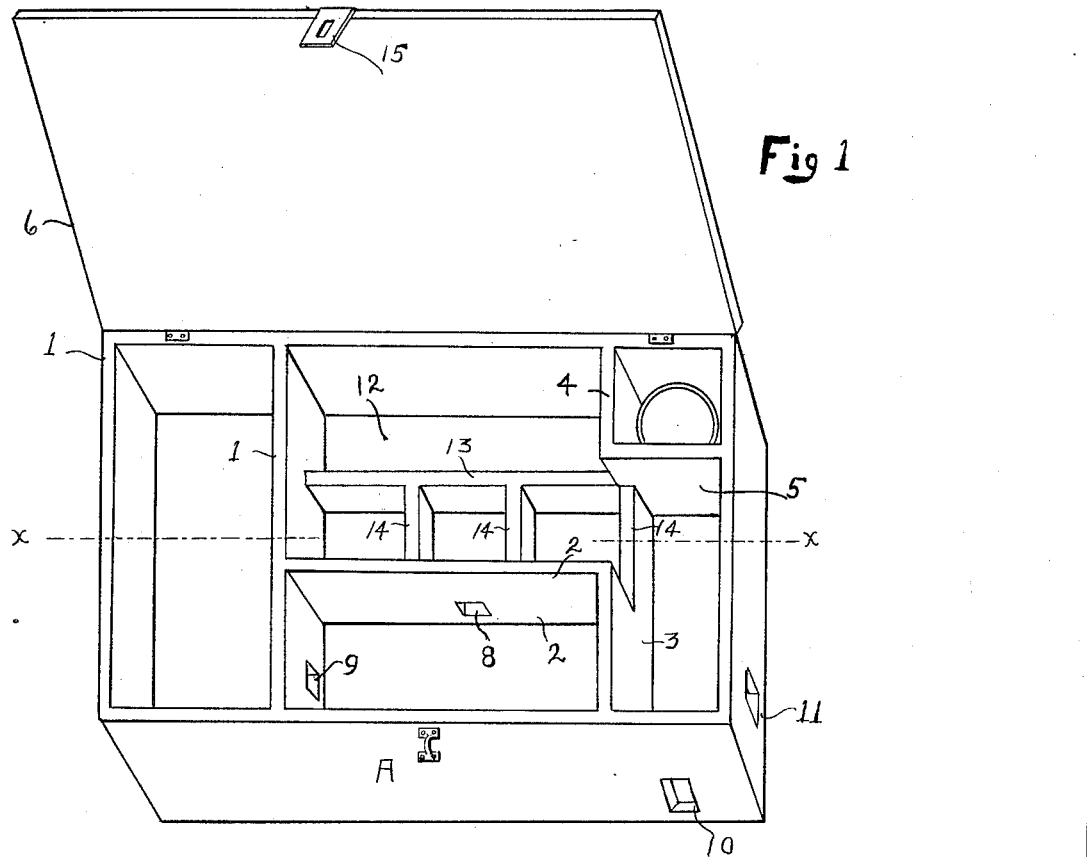
Fig 1
Fig 2
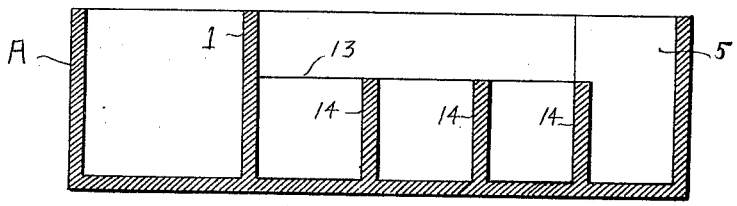
WITNESSES
H. B. Clark,
A. H. Kephart,
INVENTOR
Manuel J. Nunes,
BY
Carlos P. Griffin
ATTORNEY
COLUMBIA PLANOGRAPH CO., WASHINGTON, D. C.

UNITED STATES PATENT OFFICE.

MANUEL JOSEPH NUNES, OF NILES, CALIFORNIA.

RAT-TRAP.

1,086,610.　　　　Specification of Letters Patent.　　Patented Feb. 10, 1914.

Application filed October 5, 1911.　Serial No. 653,022.

*To all whom it may concern:*

Be it known that I, MANUEL J. NUNES, a citizen of the United States, residing at Niles, in the county of Alameda and State of California, have invented a new and useful Rat-Trap, of which the following is a specification in such full and clear terms as will enable those skilled in the art to construct and use the same.

This invention relates to a box for catching rats and its object is to produce a device which will have such a number of compartments therein as to confuse the animal and prevent his escape from the box, prior to the time the poison can take effect, thus preventing the rodent from escaping from the box or crawling under floors, or into inaccessible places and dying there.

In the drawings in which the same numeral of reference is applied to the same portion throughout the several views, Figure 1 is a plain view of the box with the cover open. Fig. 2 is a sectional view of the box taken on the line $x$—$x$ illustrating the obstructions over which the rodent must pass to reach the poisoned food.

The numeral 1 represents a box which may be of any suitable form and size, preferably about 8 inches high, 18 inches wide and 30 inches long. This box A has a series of solid partitions 1, 2, 3, 4 and 5, which extend from the bottom thereof to the hinge cover 6. One of the compartments formed by the partitions 4 and 5 is intended for a receptacle for the poisoned food. The other compartments are for the purpose of preventing the rodent's escape from the box, the opening 8 being provided in the partition 2 and opening 9 in the partition 1. The rodents have access to the box through the entrances 10 and 11 in the exterior thereof. The partitions 2 and 3 form a passage way from the entrance openings 10 and 11 around to the place where the poisoned food is placed for the rodents to eat. This poisoned food is placed in compartment 12 by the side of the box and the low partition 13. Connecting the low partition 13 to partition 2 are several low partitions 14, there being such a number of these partitions as may be deemed desirable.

The cover is held in place by means of a hasp spring catch 15, and in operation the poisoned grain is placed in compartment 12 and the cover closed. The box is then placed in any suitable position for the entry therein of the rodents. Upon passing into the box the rodents will jump over partitions 13 and 14 to get at the poisoned grain in compartment 12. After eating the poisoned grain they will be compelled to jump over partition 13, and since they do not always start to go out in the same direction they will pass into the closed chambers of the box, and the exertion of running around trying to get out of the box will cause the poison to take effect very quickly so that nearly all the rodents coming into the box and eating the poison therein will not escape therefrom. The advantage of this is seen when it is considered that such rodents frequently crawl under floors, and die and decompose there to the discomfort of every one near.

Having thus described my invention what I claim and desire to secure by Letters Patent of the United States, is as follows:

A rat catching box having a hinged cover and a plurality of compartments some of which open into each other but have no external opening, and one of which is divided by a series of low partitions over which a rodent must pass to enter the other compartments, and another compartment connecting with said divided compartment and having an opening through its outer wall for the ingress of the rodent.

In testimony whereof I have hereunto set my hand this 22d day of September, A. D. 1911, in the presence of the two subscribed witnesses.

MANUEL JOSEPH NUNES.

Witnesses:
　GEO. BUZACOTT,
　T. IRA BONNER.

---

Copies of this patent may be obtained for five cents each, by addressing the "Commissioner of Patents, Washington, D. C."